Patented Aug. 14, 1934

1,969,932

UNITED STATES PATENT OFFICE 1,969,932

SUBSTITUTE FOR RUBBER AND THE PROCESS OF ITS MANUFACTURE

Louis Laurin and Emile Bidot, Dijon, France

No Drawing. Application March 22, 1933, Serial No. 662,136. In France March 21, 1932

4 Claims. (Cl. 18—48)

All hitherto known substitutes of rubber possess many disadvantages as compared with rubber made from latex; most of them are not quite stable and, their elasticity is very limited.

The present invention relates to a process by which an incombustible very stable substitute for rubber is obtained possessing a high degree of elasticity which may be modified at will between very broad limits.

We have found that by using the following substances in suitable proportions, there may be obtained a substitute for rubber which will be incombustible, stable, elastic and insoluble.

The proportions given hereinafter may be changed according to the final product desired and are given only as an indication:

| | |
|---|---|
| Glue | 100 g. |
| Salicylic acid | 0.20 g. |
| Tragacanth gum | 25 g. |
| Wood-dust | 4.35 g. |
| Water | 200 g. |
| Glycerine | 125 g. |
| Castor oil | 18 g. |
| Colza oil | 4 g. |
| Greasy soap | 6 g. |
| Tallow | 3 g. |
| Resinate treated with formaldehyde | 3 g. |
| Resin solution | 5 g. |
| Potassium bichromate | 3 g. |
| Potash alum | 6 g. |

The above proportions may be changed to obtain certain industrial results.

The glue employed may advantageously be made from bone glue and nerve glue. Nerve glue yields a product not easily compressible. Bone glue yields a soft and elastic product which spreads easily under compression.

The above proportions, given as a general indication, may be changed from about 30 to 70 gr. for each of the glues: bone glue and nerve glue; said limits are not absolute and may be modified according to the desired elasticity.

The salicylic acid acts as an antiseptic agent and may be replaced by any other antiseptic agent.

The tragacanth gum is preferably used in the form of powder.

The wood dust should be as fine as possible and have a very low content of tannin.

The glycerine, which should be of good quality, retains the moisture and prevents the solidification of the water by frost.

The water for making the various mixtures is used as indicated in the process hereinafter described.

The vegetable oils (preferably castor oil or colza oil) maintain the elasticity of colloids and may be used in various proportions, for instance 15 to 20 g. of castor oil and 10 g. to 20 g. of colza oil. An increased quantity of oil yields a softer product.

The fat substances, such as greasy soap or tallow may be advantageously used in smaller quantities down to 5 gr. in all, the weight of the soap being twice that of the tallow.

These greasy substances act advantageously as absorbents of calories produced by friction or any other cause, when using the manufactured product.

The resinate treated with formaldehyde and the resin solution (for instance bakelite in naphtha or in any other suitable solvent) act as stabilizing agents for the colloids by coating the colloidal particles, and the proportion in which they are used may advantageously fluctuate between about 2.5 g.–3 gr. for the resinate and from 5 to 7 gr. for the resin solution.

Potassium bichromate as a powder can react only in combination with potash alum. Combined they achieve the tanning of the mass and thus help to secure the stability and the elasticity.

For obtaining the rubber substitute according to the present invention the raw materials should preferably be treated as follows.

The jellying of the glue (bone glue and nerve glue in proportions yielding the desired elasticity) is effected in a cold state by absorption of its own weight of water.

A mixture of tragacanth gum is prepared and the wood-dust is incorporated into it by means of the remaining water (about four times the weight of the gum).

Those two substances are then mixed and rendered aseptic by means of the salicylic acid or any other suitable antiseptic agent; this mixing preferably taking place in a mixer of copper or any other non corrosive material. The mixer is heated in a water bath.

The mixing having been carried into effect, the working up of the mass is begun and should not be interrupted before the end of the operation, the temperature of the water-bath remaining at about 70° to 80° C.

When the mass is rendered sufficiently homogenous by working it up, the glycerine is incorporated. When full homogeneity once more is obtained, castor oil and colza oil are introduced, and when it again gets homogeneous the tallow mixed with the greasy soap is added.

After full incorporation of these two substances the resinate treated with formaldehyde and the resin solution are added.

This last step having been effected, the potassium bichromate is added, and after a close lid has been put on the mixer in order to keep the mass in the dark, the potash alum is introduced in solution and the working up is continued until the mass reaches the desired plasticity and allows of being moulded in a hot state.

After cooling, the product thus obtained will be of a brownyellowish colour.

For a few days the moulded product is subjected to the catalytic action of light emitting ultraviolet rays (sun light, electric arc, etc.), the length of the exposure being variable according to the spectrum and to the power of the rays as well as to the size of the pieces.

During this time the weight of the product will be lowered by 5 to 8% of the initial weight when moulded.

After that the product will be quite stable, as regards weight and structure, and it will not be affected either by heat or by cold, the product is very elastic and fire proof.

By changing the proportions of the materials the product may be rendered sufficiently elastic to be put to all the different uses of the ordinary rubber.

It is to be understood that without departing from the scope of the invention, the proportion of the materials used may be modified so as to obtain substances with different physical properties.

We claim:

1. A process of manufacture of a substitute of rubber which consists in adding to a mixture of glue as hydrogel and tragacanth gum with wood dust one after the other; glycerine, vegetable oils, resinate treated by formaldehyde, a resin solution, potassium bichromate, potash alum; each addition followed by a homogenization obtained by working it up or in any other way, the mass being kept in darkness from the time potash alum is added during a time which may vary, then moulding and exposing the pieces obtained during a variable time to the action of a light containing ultraviolet rays.

2. A process of producing a rubber substitute consisting in adding one after the other to a jellied mixture of bone glue and nerve glue, tragacanth gum, wood dust, glycerine, vegetable oils, resinate treated with formaldehyde, a resin solution, potassium bichromate, and potash alum, homogenizing the mixture after each addition, keeping the mass in darkness from the time the alum is added, moulding the mass in hot condition, and exposing the moulded articles to the action of ultra-violet rays.

3. A process of producing a rubber substitute consisting in making a mixture of jellied glue, tragacanth gum and wood dust, and adding to said mixture, one after the other, glycerine, castor oil, colza oil, tallow mixed with greasy soap, resinate treated with formaldehyde, a resin solution, potassium bichromate, and potash alum, homogenizing the mixture after each addition, keeping the mass in darkness from the time the alum is added, and moulding the mass in hot state.

4. A process of producing a rubber substitute consisting in making a mixture of jellied bone glue and nerve glue, tragacanth gum and wood dust, and adding to said mixture under a temperature of 70°–80° C. and one after the other, glycerine, vegetable oils, resinate treated with formaldehyde, a resin solution, potassium bichromate, and potash alum, homogenizing the mixture after each addition, keeping the mass in darkness from the time the alum is added, and moulding the mass in hot condition.

LOUIS LAURIN.
EMILE BIDOT.